United States Patent
Kwon et al.

(10) Patent No.: US 9,704,382 B2
(45) Date of Patent: Jul. 11, 2017

(54) METHOD FOR CALCULATING ERROR RATE OF ALARM

(71) Applicant: SAMSUNG SDS CO., LTD., Seoul (KR)

(72) Inventors: Soon-Mok Kwon, Seoul (KR); Ji-Hoon Kang, Seoul (KR); Dong-Ho Yoo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 15/091,261

(22) Filed: Apr. 5, 2016

(65) Prior Publication Data

US 2017/0069198 A1  Mar. 9, 2017

(30) Foreign Application Priority Data

Sep. 9, 2015 (KR) .................. 10-2015-0127438

(51) Int. Cl.
G08B 29/00 (2006.01)
G08B 29/18 (2006.01)

(52) U.S. Cl.
CPC .................. *G08B 29/185* (2013.01)

(58) Field of Classification Search
CPC .................. G08B 29/185; G08B 25/00
USPC .................. 340/506, 507
See application file for complete search history.

(56) References Cited

U.S. PATENT DOCUMENTS

| 2007/0300302 A1* | 12/2007 | Morin | G08B 29/22 |
| | | | 726/23 |
| 2008/0307273 A1* | 12/2008 | Nguyen | G06F 11/073 |
| | | | 714/704 |
| 2015/0257118 A1* | 9/2015 | Siomina | G01S 5/021 |
| | | | 455/456.1 |

FOREIGN PATENT DOCUMENTS

| JP | 2007-328522 A | 12/2007 |
| JP | 2010-540930 A | 12/2010 |
| JP | 2014-16691 A | 1/2014 |
| WO | 2009/045616 A2 | 4/2009 |

OTHER PUBLICATIONS

Jongmin Kim et al., "A Study of Data Mining Methodology for Effective Analysis of False Alarm Event on Mechanical Security System", Journal of information and security, vol. 12, No. 2, (May 2012), Total 10 pages.
Communication dated Jan. 11, 2017, issued by the Korean Intellectual Property Office in corresponding Korean Application No. 10-2015-0127438.

* cited by examiner

*Primary Examiner* — Tai T Nguyen
(74) *Attorney, Agent, or Firm* — Sughrue Mion, PLLC

(57) ABSTRACT

Disclosed is a method for calculating an error rate of alarm that reports a failure of facility, calculating a true probability and a false probability of alarms generated for each time zone by a past failure record data and calculating the error rate of the alarm at a rate of the false probability to the true probability of the alarms generated for each time zone.

20 Claims, 7 Drawing Sheets

| | | | |
|---|---|---|---|
| 1st | $t_{Sample,1}$, | $t_{Sample,2}$, | $(t_{Sample,3})$ |
| 2nd | $t_{Sample,1}$, | $(t_{Sample,3})$, | $t_{Sample,5}$ |
| 3rd | $t_{Sample,1}$, | $(t_{Sample,3})$, | $(t_{Sample,3})$ |
| 4th | $(t_{Sample,3})$, | $(t_{Sample,3})$, | $t_{Sample,8}$ |
| ⋮ | | | |
| Nth | | | |

$P_{Sample,3} = M$ $t_{P1}$  $t_{A1}$  $t_{B1}$  $t_{P2}$  $(t_{A2})$

| Data | ERROR RATE |
|---|---|
| $t_{P,a}$, $t_{A,a}$, $t_{B,a}$ | 23% |
| $t_{P,b}$, $t_{A,b}$, $t_{B,b}$ | 12% |
| $t_{P,c}$, $t_{A,c}$, $t_{B,c}$ | 17% |

1200

METHOD FOR CALCULATING ERROR RATE OF ALARM

This application claims priority from Korean Patent Application No. 10-2015-0127438 filed on Sep. 9, 2015 in the Korean Intellectual Property Office, the disclosure of which is incorporated herein by reference in its entirety.

BACKGROUND OF THE INVENTION

1. Field of the Invention

The present invention relates to a method for calculating an error rate of alarm, and more particularly, to a method for calculating an error rate of alarm which calculates the error rate of alarm in consideration of the characteristics of a time zone in which the alarm is generated, and provides the error rate to an operator of facility only when the alarm generated as a result of calculation is determined not to be a false alarm.

2. Description of the Related Art

Anomaly detection generates an alarm by determining whether the current state is normal or abnormal based on the data stored in the past, and is utilized in many fields.

For example, the anomaly detection corresponds to application of the abnormality detection method to large-scale infrastructures such as various facilities such as large motors and pumps in the plant, power plant turbines and air conditioners inside the buildings to generate the alarm before a failure actually occurs.

However, a false alarm in which an alarm is generated even though there is no problem in the operation of the detection target has been recognized as one of the problems of the anomaly detection. User's inconvenience, economic loss, gap of security work or the like caused by the false alarm reduce the utility of the anomaly detection solutions.

Thus, there is a need for a method capable of investigating the causes of the generated false alarms, extracting and analyzing the investigated factors and eliminating false alarms that may occur in the future.

A Study of Data Mining Methodology for Effective Analysis of False Alarm Event on Mechanical Security System, Information and Security Journal Vol. 12, No. 2 (May 2012), JonoMin Kim, KyongHo Choi and DongHwi Lee

SUMMARY OF THE INVENTION

An aspect of the present invention provides a method for calculating an error rate of alarm, in consideration of the characteristics of the time zone in which the alarm is generated.

Another object of the present invention provides a method for calculating the error rate of alarm, by utilizing the past facility inspection records and failure records, when considering the characteristics of the time zone in which the alarm is generated.

Still another object of the present invention provides a method for calculating the error rate of alarm capable of calculating a probability that the alarms generated for each time zone are true, by utilizing a bootstrap algorithm that is a nonparametric estimation technique.

Still another object of the present invention provides a method for calculating the error rate capable of selecting the alarms having a high true possibility among the generated alarms and providing the alarms to a user.

However, aspects of the present invention are not restricted to those set forth herein. The above and other aspects of the present invention that have not been mentioned will become more apparent to one of ordinary skill in the art to which the present invention pertains by referencing the detailed description of the present invention given below.

According to an aspect of the present invention, there is provided a method for calculating an error rate of alarm that reports a failure of facility, calculating a true probability and a false probability of alarms generated for each time zone by a past failure record data and calculating the error rate of the alarm at a rate of the false probability to the true probability of the alarms generated for each time zone.

In an embodiment of the present invention, wherein calculating the true probability and the false probability of alarms generated for each time zone comprises: calculating a cumulative distribution function (CDF) of the facility service life by the past failure record data and calculating the cumulative distribution function of the lead time by the past failure record data.

In an embodiment of the present invention wherein calculating the cumulative distribution function of the service life of the facility comprises: sampling a time interval in which the facility inspection is performed, by the service life of the facility and calculating the cumulative distribution function of the service life of the facility by the sampled service life data of the facility.

In an embodiment of the present invention wherein calculating the cumulative distribution function of the facility service life by the service life data of the facility comprises: configuring a plurality of data groups including the plurality of the service life data, by randomly extracting any number of data among the plurality of sampled facility service life data, calculating a probability that a certain facility service life data is included for each data group and calculating the cumulative distribution function of the certain facility service life data in the entire data by calculating an average value of the probability.

In an embodiment of the present invention wherein calculating the cumulative distribution function of the lead time comprises: sampling a difference between the time of occurrence of failure in the past and the time of generation of the alarm and calculating the cumulative distribution function of the lead time by the data of a difference between the sampled failure occurrence time and the alarm generation time.

In an embodiment of the present invention further comprising: storing a failure record data used to calculate the error rate of the calculated alarm and the error rate of the alarm.

In an embodiment of the present invention wherein storing the failure record data comprises: storing the time at which the facility inspection is performed on the facility, the alarm generation time, the failure occurrence time, and the lead time of the alarm generation time.

In an embodiment of the present invention further comprising: when the new alarm is generated, estimating an error rate calculated by the failure data identical or similar to the failure data of the new alarm.

In an embodiment of the present invention the method further comprising: providing the new alarm to the user, only when the error rate of the estimated new alarm is less than a preset threshold value.

According to another aspect of the present invention, there is provided an apparatus for calculating an error rate of the alarm that reports an occurrence of failure of facility, the apparatus comprising: a storage unit that stores the past failure record data of the facility, a bootstrap estimation unit that calculates a true probability and a false probability of the alarms generated for each time zone by the past failure record data of the facility and an error rate calculation unit that calculates the error rate of the alarm at a rate of the false probability to the true probability of the alarms generated for each time zone.

In an embodiment of the present invention wherein the bootstrap estimation unit calculates a cumulative distribution function (CDF) of the facility service life, and a cumulative distribution function of the lead time, by the past failure record data of the facility.

In an embodiment of the present wherein the bootstrap estimation unit samples a time interval of the facility inspection as the service life of the facility, and calculating the cumulative distribution function of the facility service life by the sampled service life data of the facility.

In an embodiment of the present wherein the bootstrap estimation unit configures a plurality of data groups including the plurality of the service life data, by randomly extracting any number of data among the plurality of sampled facility service life data, calculates a probability that a certain facility service life data is included for each data group, and thereafter, calculates the cumulative distribution function of the certain facility service life data in the entire data by calculating an average value of the probability.

In an embodiment of the present wherein the bootstrap estimation unit samples a difference between the occurrence time of failure in the past and the generation time of the alarm, and calculates the cumulative distribution function of the lead time by the data of a difference between the sampled failure occurrence time and the alarm generation time.

In an embodiment of the present wherein the storage unit stores a failure record data used to calculate the error rate of the calculated alarm and the error rate of the alarm.

In an embodiment of the present wherein the failure record data is at least one of the time of performance of facility inspection on the facility, the alarm generation time, the failure occurrence time, and the lead time of the alarm generation time.

In an embodiment of the present the method further comprising: a selection unit that estimates an error rate calculated by the failure data identical or similar to the failure data of a new alarm to the error rate of the new alarm, when the new alarm is generated.

In an embodiment of the present the method further comprising: an alarm generation unit that provides the new alarm to a user, only when the error rate of the estimated new alarm is less than a preset threshold value.

According to another aspect of the present invention, there is provided an apparatus for calculating an error rate of alarm that reports a failure of acility, the apparatus comprising: one or more processors, a memory that loads a computer program executed by the processors and a storage that stores a computer program that manages a license, wherein the computer program comprises: an operation that calculates a true probability and a false probability of the alarms generated for each time zone by a past failure record data and an operation that calculates the error rate of the alarm at a rate of the false probability to the true probability of the alarms generated for each time zone.

According to another aspect of the present invention, there is provided a computer program that is coupled to a computer device to calculate an error rate of alarm that reports a failure of facility, wherein the computer program is recorded in a storage medium to execute calculating a true probability and a false probability of the alarms generated for each time zone by a past failure record data, and calculating the error rate of the alarm at a rate of the false probability to the true probability of the alarms generated for each time zone.

According to the apparatus and method for calculating the error rate of alarm according to an embodiment of the present invention described above, it is possible to achieve an effect capable of estimating the error rate of the alarms generated in a successive time from the past data and providing the error rate to a user.

Moreover, thus, it is possible to achieve an effect capable of minimizing the user's inconvenience and economic loss due to the occurrence of false alarms.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, it will be understood that the singular forms are intended to include the plural forms as well. It will be further understood that the terms "comprises" and/or "comprising," when used in this specification, specify the presence of stated features, integers, steps, operations, elements, and/or components, but do not preclude the presence or addition of one or more other features, operations, elements, and/or components thereof.

Figure 1:
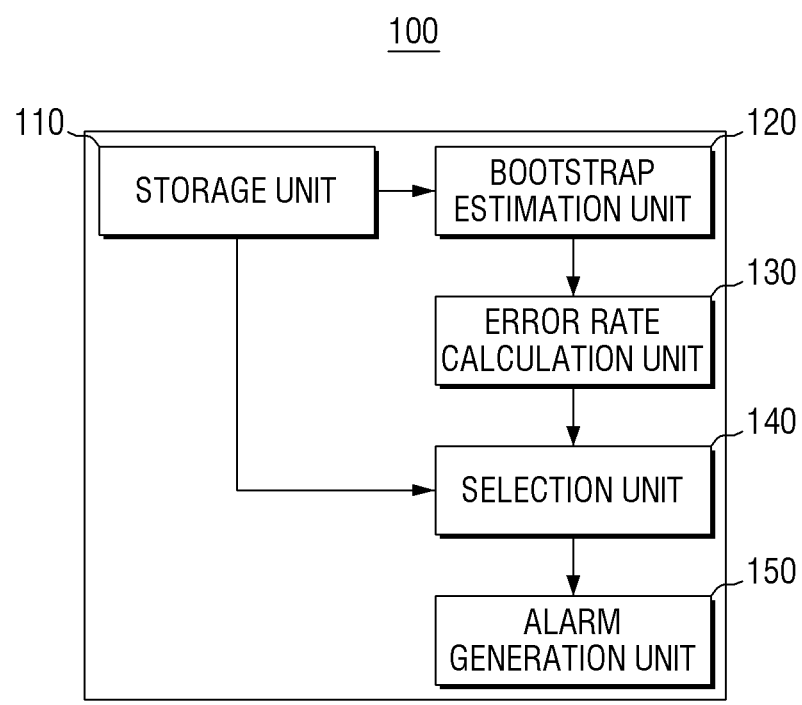
FIG. 1 is a functional block diagram for explaining an apparatus for calculating error rate of alarm according to an embodiment of the present invention.

FIG. 1 is a functional block diagram for explaining an apparatus for calculating error rate of alarm according to an embodiment of the present invention.

An apparatus 100 for calculating an error rate of alarm according to an embodiment of the present invention includes a storage unit 110, a bootstrap estimation unit 120, an error rate calculation unit 130, a selection unit 140 and an alarm generation unit 150.

However, in the apparatus for calculating the error rate illustrated in FIG. 1, only the components relevant to embodiments of the present invention are illustrated. Therefore, it will be apparent to those skilled in the art that other general-purpose components may be further included in addition to the components illustrated in FIG. 1.

The storage unit 110 stores the past failure record data of the facility. The past failure record data according to an embodiment of the present invention may be records regarding the time at which the facility inspection is performed for the facility, the past alarm generation time, the actual failure occurrence time and the lead time of the alarm generation time.

The bootstrap estimation unit 120 calculates the true probability and false probability of the alarms generated for each time zone, by the past failure record data of the facility. The true probability of the generated alarm may be calculated from a cumulative distribution function of the facility service life, and the false probability may be calculated from the cumulative distribution function of the lead time. Here, the alarm lead time means the time required up to an occurrence of the actual failure after the alarm.

The process of calculating the true probability and the false probability of the generated alarm from the cumulative distribution function of the facility service life and the cumulative distribution function of the lead time will be described in detail in FIGS. 2 to 6.

The error rate calculation unit 130 calculates the error rate of the alarm at a rate of the true probability to the false probability of alarms generated for each time zone. Here, the error rate of alarm means a probability that the alarm is generated despite the low capability of an occurrence of the actual failure, that is, a probability that the alarm is a false alarm.

A higher error rate means that there is a high probability that the generated alarm is a false alarm, and a lower error rate means that there is a low probability that the generated error is a false alarm.

The selection unit 140 estimates the error rate calculated by the failure data identical or similar to the failure data of the new alarm as an error rate of the new alarm, when a new alarm is generated. In the method for calculating the error rate of alarm according to an embodiment of the present invention, since it is not possible to calculate an error rate of alarm before an occurrence of the actual failure, the error rate of the currently generated alarm is estimated from the error rate of alarm calculated in the past.

The method for estimating the currently generated error rate of alarm from the past failure record data will be described in detail in FIGS. 7 to 9.

The alarm generation unit 150 provides the new alarm to the user, only when the error rate of the new alarm is less than a preset threshold value. That is, the alarm generation unit 150 performs a function as a kind of filter that selects only an alarm other than the false alarm among the generated alarms and provides the selected alarm to the users.

With the apparatus for calculating the error rate of alarm according to the embodiment of the present invention, it is possible to achieve an effect that is capable of estimating the error rate of the alarm generated in a successive time from the past data and providing the error rate to the user.

Hereinafter, a method for calculating the error rate of alarm, and a method for estimating the error rate of the currently generated alarm from the past failure data will be described in detail.

Figure 2:
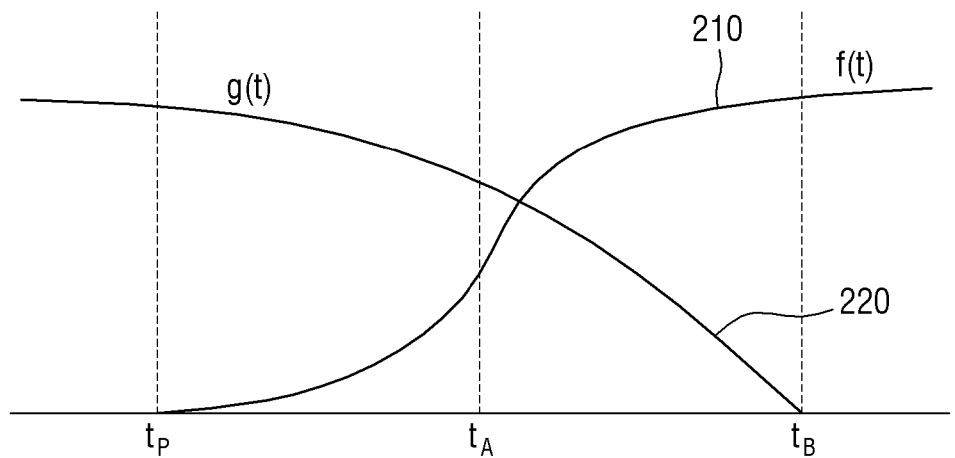
FIG. 2 is a diagram for explaining a process of calculating an error rate of the alarms generated in the past failure record data according to an embodiment of the present invention.

FIG. 2 is a diagram for explaining a method for calculating an error rate of alarm generated from the past failure record data according to an embodiment of the present invention.

In the graph illustrated in FIG. 2, $t_P$ means the time at which the facility inspection is performed, $t_A$ means the time at which the alarm is generated, and $t_B$ means the time at which the actual failure occurs.

An f function 210 representing the probability that the alarm generated for each time zone is true according to an embodiment of the present invention may be calculated from the cumulative distribution function of the facility service life for each time zone. Specifically, the f function 210 that means the probability that the alarm generated for each time zone is true may be derived through the following process.

$$f(t)=f'(t-t_P) \qquad \text{[Formula 1]}$$

Here, f'(t) means a cumulative distribution function (CDF) of the facility service life.

According to the above Formula 1, the f function 210 may be obtained by moving the cumulative distribution function of the facility service life by the facility inspection time $t_P$.

Since the probability that the service life of the facility is expired increases as it comes closer to the time tB at which the failure occurs, the alarm generated in proximity to $t_B$ increases in the true probability. Therefore, the f function 210 that means the true probability of the alarm generated for each time zone is illustrated to have a larger value as it comes closer to $t_B$.

Meanwhile, a g function 220 that means the false probability of the alarm generated for each time zone may be calculated from the cumulative distribution function of the alarm lead time for each time zone.

As the lead time is short, that is, in the alarm generated around the time at which the actual failure occurs, the false probability of alarm becomes smaller.

The g function 220 may be derived through the following process from the cumulative distribution function of the above-mentioned alarm lead time.

$$g(t)=g'(t_B-t) \quad \text{[Formula 2]}$$

Here, g'(t) means the cumulative distribution function of the alarm lead time. According to the above-described Formula 2, the g function 220 may be obtained by moving the cumulative distribution function of the alarm lead time by $t_B$ after symmetrical movement in the y-axis.

Since the alarm generated around $t_B$ has a short lead time, and the false probability of the alarm generated around occurrence of the actual failure becomes lower, the g function 220 that means the false probability of alarm generated for each time zone may be illustrated as in FIG. 2.

The error rate of alarm generated at a certain time $t_A$ may be calculated as a ratio of the f function 210 that is the true probability of the generated alarm to the g function 220 that is the false probability of the generated alarm.

When expressing this by formula, the error rate of alarm generated at a certain time $t_A$ may be represented as follows:

$$\text{error rate}=g(t_A)/f(t_A) \quad \text{[Formula 3]}$$

As it comes closer to $t_B$ that is an occurrence time of the actual failure, the value of the g function 220 becomes smaller, and the value of the f function 210 becomes larger. Thus, the error rate becomes smaller. That is, it means that the probability of false alarm becomes smaller in the alarm generated in proximity to $t_B$.

Meanwhile, in the case of alarm generated immediately after the $t_P$ time at which the facility inspection is performed, since the g function 220 has a large value and the f function 210 has a small value, the error rate increases. That is, it means that the probability of false alarm is large in the alarm generated in the vicinity of $t_P$.

Normally, since the probability that the failure occurs in the facility immediately after finishing the facility inspection is smaller than the probability that the failure occurs at the time when the service life of the facility is imminent, it is possible to understand that the logical prediction results are consistent with the error rate expressed by the Formula.

Meanwhile, the above-mentioned function f 210 and the g function 220 may be calculated after the alarm is generated at $t_A$ and the actual failure occurs. That is, the error rate of alarm is calculated at the time of the occurrence of the actual failure after generation of the alarm, rather than being calculated at the time of the generation of the alarm.

The f function 210 and the g function 220 used to calculate the error rate are calculated from the performance time of the facility inspection, the alarm generation time, the failure occurrence time and the lead time of the alarm generation time. The reason is that the above-described data can be obtained after an occurrence of the actual failure.

Therefore, the error rate of the currently generated alarm may be estimated from the error rate calculated in the past. The method for estimating the error rate of the currently generated alarm from the error rate calculated in the past will be described below.

Meanwhile, although FIG. 2 illustrates a case where the facility inspection and failure occur once as an example, the inspection of the facility and the failure may also occur for a plurality of number of times in the course of actually operating the facility.

Figure 3:
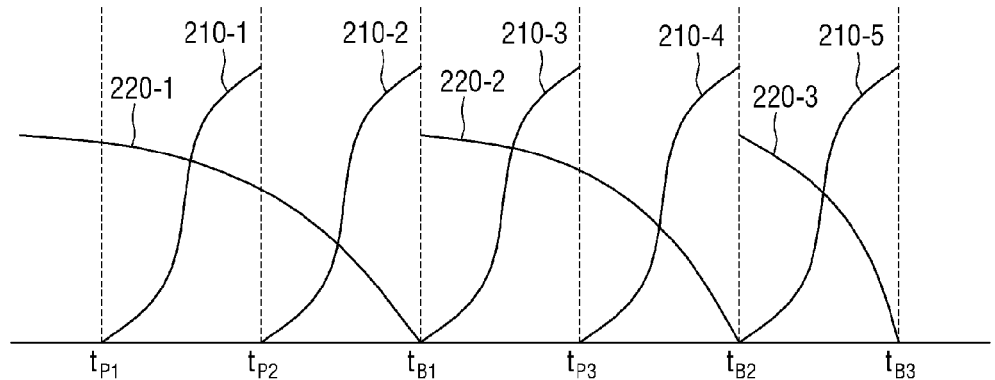
FIG. 3 is a diagram for explaining a method for calculating a function f and a function g according to an embodiment of the present invention, when facility inspections and failures exist multiple times.

FIG. 3 is a diagram for explaining a method for calculating the f function and the g function when the facility inspection and failure exist for a plurality of number of times according to an embodiment of the present invention.

Since the f functions 210-1, 210-2, 210-3, 210-4 and 210-5 are calculated from the cumulative distribution function of the facility service life, they are initialized each time there is facility inspection. The reason is that the service life of the facility is updated to the initial value after the facility inspection is performed.

Therefore, it is possible to check that the f functions 210-1, 210-2, 210-3, 210-4 and 210-5 are initialized for each $t_{P1}$, $t_{P2}$ and $t_{P3}$ representing the facility inspection in the graph illustrated in FIG. 3.

Since the g functions 220-1, 220-2 and 220-3 are calculated from the cumulative distribution function of the alarm lead time, they are initialized each time the actual failure occurs.

Therefore, it is possible to check that the g functions are initialized for each of $t_{B1}$, $t_{B2}$, $t_{B3}$ that represent the occurrence of actual failure in the graph illustrated in FIG. 3.

Meanwhile, the error rate of the alarm generated at a certain time may be differently calculated depending on the section to which the generation time of the alarm belongs. The reason is that, as described above, the f function is initialized each time there is a facility inspection, and the g function is initialized each time the actual failure occurs.

When the generation time of alarm is set to $t_A$, the error rate calculated based on the generation time of $t_A$ may be expressed as follows.

$\text{error rate}=g(t_A)/f(t_A)$, where $f(t)=f'(t-t_{p1})$ if $t_{p1} \leq t < t_{p2}$ where $f(t)=f'(t-t_{p2})$ if $t_{p2} \leq t < t_{B1}$ where $f(t)=f'(t-t_{B1})$ if $t_{B1} \leq t < t_{p3}$ where $f(t)=f'(t-t_{p3})$ if $t_{p3} \leq t < t_{B2}$ where $f(t)=f'(t-t_{B2})$ if $t_{p2} \leq t$ where $g(t)=g'(t_{B1}-t)$ if $t < t_{B1}$ where $g(t)=g'(t_{B2}-t)$ if $t_{B1} \leq t < t_{B2}$ where $g(t)=g'(t_{B3}-t)$ if $t_{B2} \leq t < t_{B3}$ [Formula 4]

Further, when generalizing Formula 4, it can be expressed as follows.

$\text{error rate}=g(t_A)/f(t_A)$, where $f(t)=f'(t-t_i)$ if $t_i \leq t_A < t_{i+1}, t_i \in T_P U\ T_B, 1 \leq i \leq |T_P U\ T_B|, t_i \leq t_{i+1}$ $g(t)=g'(t_i-t)$ if $t_{i-1} \leq t_A < t_i, t_i \in T_B, 1 \leq i \leq |T_B|, t_{i-1} \leq t_i, t_0 = -\infty$ [Formula 5]

Meanwhile, the cumulative distribution function of the facility service life and the cumulative distribution function of the alarm lead time required to calculate the true probability and the false probability of the generated alarm may be estimated from the past failure record data.

Figure 4:
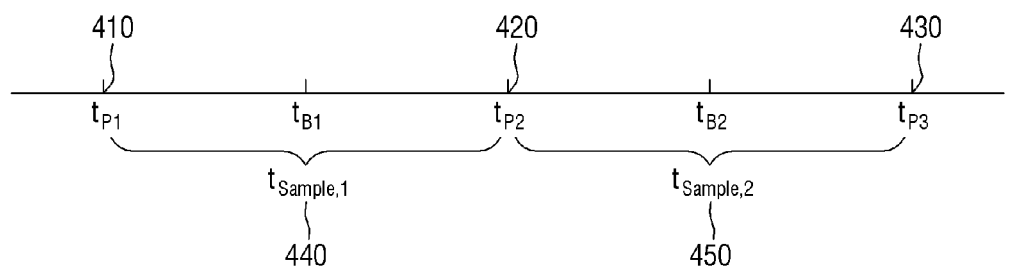
FIG. 4 is a diagram for explaining a process of estimating the facility service life from the past failure record data according to an embodiment of the present invention.

FIG. 4 is a diagram for explaining a process of estimating the facility service life from the past failure record data according to an embodiment of the present invention.

In order to calculate the cumulative distribution function of the facility service life, there is a need for a large number of sample data of the facility service life. Thus, the bootstrap estimation unit 120 according to an embodiment of the present invention may generate the sample data of the facility service life, by utilizing the data stored in the storage unit 110 in advance, and may calculate the cumulative distribution function of the facility service life, using the sample data.

The bootstrap estimation unit 120 may sample the interval between the facility inspections as a service life of the facility, and may calculate the cumulative distribution function of the facility service life by the service life data of the sampled facility.

For example, when there is a facility inspection at the time $t_{p1}$ 410, the time $t_{p2}$ 420 and the tine $t_{p3}$ 430 at a preset time interval for any facility, the sampling intervals of each facility time may be sampled as the service life of the facility.

Typically, since the facility inspection is conducted when the service life of the facility is imminent, when sampling the interval between the facility inspections, it is possible to estimate the service life of the facility.

In the embodiment illustrated in FIG. 4, by sampling the interval between the time $t_{p1}$ 410 and the time $t_{p2}$ 420 as a first service life 440 of the facility and by sampling the interval between the time $t_{p3}$ 430 and the time $t_{p2}$ 420 as a second service life 450, it is possible to store the data concerning the service life of the facility.

Moreover, the data acquired through the above-described process may be used to estimate the cumulative distribution function of the service life of the facility.

Figure 5:
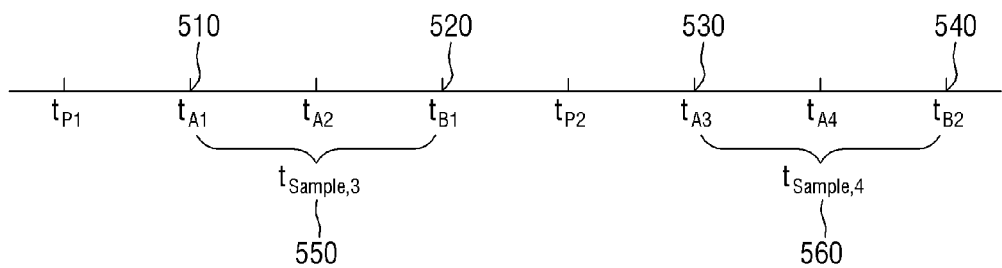
FIG. 5 is a diagram for explaining a process of storing the alarm lead time data from the past failure record data according to an embodiment of the present invention.

FIG. 5 is a diagram for explaining a process of storing the data of the alarm lead time from the past failure record data according to an embodiment of the present invention.

In order to calculate the cumulative distribution function of the alarm lead time, there is a need for a plurality of sample data of the lead time. Thus, the bootstrap estimation unit 120 according to an embodiment of the present invention may generate the sample data of the facility service life, by utilizing the data stored in the storage unit 110 in advance, and may calculate the cumulative distribution function of the lead time, using the sample data.

The bootstrap estimation unit 120 may sample a difference between the past occurrence time of the failure and the generation time of the alarm, and may calculate the cumulative distribution function of the lead time by the sampled data.

As described above, since the alarm lead time is a difference between the occurrence time of the actual failure and the generation time of the alarm, when checking the past failure history, it is possible to sample a plurality of data of the lead time.

For example, the time required to the time $t_{B1}$ 520 of occurrence of the actual failure after generation of the alarm at the past $t_{A1}$ time 510 may be sampled to a first lead time 550, and the time required to the $t_{B2}$ time 540 of occurrence of the actual failure after generation of the alarm at the past $t_{A3}$ time 530 may be sampled to a second lead time 560.

When sampling the data of a plurality of lead times via the above-mentioned process, it is possible to calculate the cumulative distribution function of the lead time.

Hereinafter, a process of calculating the cumulative distribution function by the bootstrap estimation unit 120 using the sampled data will be described in more detail.

Figures 6, 7, 8:
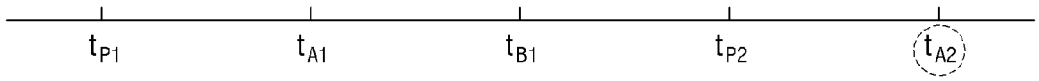
FIG. 6 is a diagram for explaining a specific operation of a bootstrap estimation unit according to an embodiment of the present invention.
FIG. 7 is a diagram for explaining a process of estimating the error rate of the currently generated alarm according to an embodiment of the present invention.
FIG. 8 is a diagram for explaining a method for determining the error rate of the currently generated alarm, by utilizing the similarity of the failure data according to an embodiment of the present invention.

FIG. 6 is a diagram for describing a specific operation of the bootstrap estimation unit according to an embodiment of the present invention.

After sampling a plurality of data through the process described in FIGS. 4 and 5, the bootstrap estimation unit 110 calculates the cumulative distribution function using that data.

Specifically, the bootstrap estimation unit 110 randomly extracts the data, while allowing the overlap of the plurality of data. In addition, the bootstrap estimation unit 110 allows the extracted data to form a sample group.

For example, as illustrated in FIG. 6, when repeating the extraction of data for N times so that three pieces of data randomly extracted form a group, N sample groups are configured. At this time, the probability that a specific data, e.g., $t_{sample, 3}$ is included in a group is calculated. Similarly, after calculating the probability that the specific data is included in the other group, when calculating an average of the values, it is possible to derive a cumulative distribution function of the data in the entire data.

As described above, when estimating the cumulative distribution function for a specific data, it is possible to achieve an effect capable of efficiently estimating the cumulative distribution function, even when the distribution of the population is not relatively known, and the number of available data is small.

FIG. 7 is a diagram for explaining a process of estimating the error rate of the currently generated alarm according to an embodiment of the present invention.

In the method for calculating the error rate according to an embodiment of the present invention, to enable the calculation, the alarm sounding time $t_{Ax}$ needs to satisfy conditions of $t_P \leq t_{A,x} < t_B$, with respect to the facility inspection time $t_P$ and the failure time $t_B$.

Therefore, in regard to the alarm generated after occurrence of the last failure, it is not possible to calculate the error rate of the alarm. The method for calculating the error rate according to an embodiment of the present invention is calculated, using the cumulative distribution function of the alarm service life, and the cumulative distribution function of the alarm lead time. The reason is that it is not possible to accurately estimate the data when a failure does not yet occur.

For example, the error rate of the alarm tA1 generated after the facility inspection $t_{p1}$ in FIG. 5 may be calculated after $t_{B1}$ in which the actual failure occurs. Therefore, it is not possible to calculate the error rate of the alarm generated at t time at the time when a failure does not yet occur.

Therefore, the selection unit 140 according to an embodiment of the present invention may store the error rate of alarm generated before the occurrence of failure and the failure data used to calculate the error rate in the storage unit 110, when a new failure occurs.

For example, it is possible to store the cumulative distribution function of the facility service life used to calculate an error rate of alarm, the cumulative distribution function of the alarm lead time, and the calculated error rate.

Thereafter, when a new alarm is generated, by comparing the failure data measured at the time of generation of the alarm to the failure data of the alarms generated in the past, the error rate of the alarm with the same or the most similar failure data may be determined as the error rate of the currently generated alarm.

FIG. 8 is a diagram for explaining a method for determining the error rate of the currently generated alarm, by utilizing the similarity of the failure data according to an embodiment of the present invention.

As described above, the selection unit 140 stores the error rate of the alarm generated before the occurrence of failure and failure data used for calculating the error rate, and the data illustrated in FIG. 8 may be stored in the storage unit 110. The failure data according to an embodiment of the present invention may include the facility inspection time, the alarm generation time, the actual failure occurrence time and the like.

When a new alarm is generated, the failure data described above are transmitted to the selection unit 140. The selection unit 140 may select the failure data identical or most similar to the failure data of a new alarm among the plurality of failure data stored in advance, and may determine the error rate of alarm calculated based on the failure data as the error rate of the currently generated alarm.

Meanwhile, as a method for calculating the similarity between the failure data of a new alarm and a plurality of failure data stored in advance, Euclidian distance or the like may be used, but it is not limited thereto, and other general techniques may also be used.

Further, in the above-described embodiment, although the description has been given of a case where an error rate identical or similar to the failure data of the new alarm is selected as an example, but it is not limited thereto, and error rates of the plurality of alarms may be selected, and by calculating the average value of the error rates, the average value may be determined as the error rate of the new alarm.

To determine the error rate of the new alarm from the error rate of the alarms generated in the past, information about the error rate needs to be kept up to date. The reason is that, as more data are stored, the more accurate value can be selected.

Therefore, the error rate can be achieved such that the data relevant to the failure when a failure occurs, the error rate of alarm generated before the occurrence of failure or the like is stored.

Figure 9:
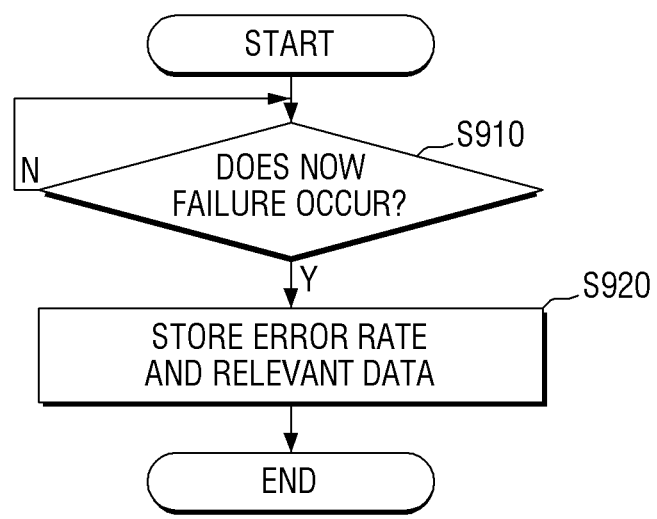
FIG. 9 is a flowchart for explaining a process of keeping information on the error rate up to data according to an embodiment of the present invention.

FIG. 9 is a flow chart for explaining a process of keeping information on the error rate according to an embodiment of the present invention up to date.

When a new failure occurs in the facility (S910), the error rate of the alarm generated before the occurrence of failure is calculated, and the data relevant thereto are stored (S920). When the plurality of alarms is generated between the last failure time and a new failure time, each of the error rates of each alarm is calculated, and the relevant data may be stored.

As described above, when a failure occurs in the facility, since the error rate of previously generated alarm and the relevant failure data are kept up to date, it is possible to achieve an effect capable of selecting a more accurate error rate in the newly generated alarm.

Meanwhile, the apparatus for calculating the error rate of alarm according to an embodiment of the present invention may also provide only the selected alarms to a user, in consideration of the error rate of alarm.

Figure 10:
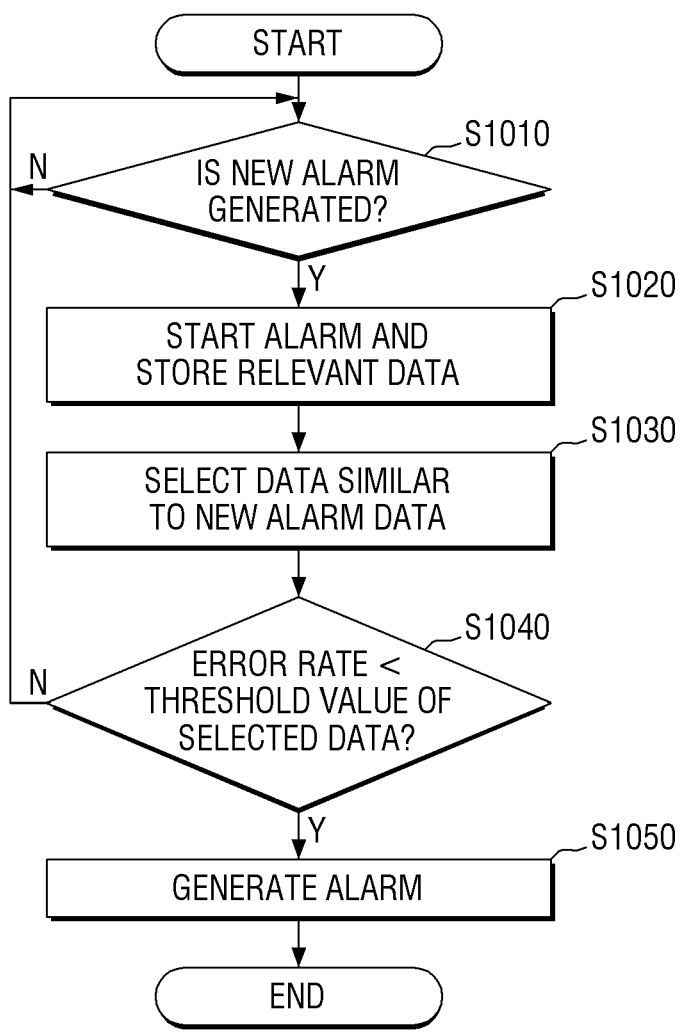
FIG. 10 is a flowchart for explaining a method for selectively providing an alarm generated in consideration of the error rate of alarm according to an embodiment of the invention to the user.

FIG. 10 is a flow chart illustrating a method for selectively providing a user with an alarm generated in consideration of the error rate of alarm according to an embodiment of the invention.

By determining whether a new alarm is generated (S1010), when an alarm is generated, the generation time of the alarm and the data relevant to the alarm are stored (S1020). Thereafter, among the plurality of failure data stored in advance, the failure data identical or similar to the failure data of a new alarm is selected to estimate the error rate of the newly generated alarm (S1030).

Thereafter, only when the error rate of the new alarm is less than a preset threshold value, a new alarm is provided to the user (S1040). When the error rate of the new alarm is equal to or greater than the preset threshold, it is determined as a false alarm that occurs even though there is no possibility of failure, and the false alarm is filtered.

Therefore, it is possible to achieve an effect capable of minimizing the user's inconvenience and the economic loss due to the generation of false alarm. At this time, the preset threshold value may be set by a user, depending on the characteristics of the facility, or may be automatically determined depending on the operating conditions of the facility.

Figure 11:
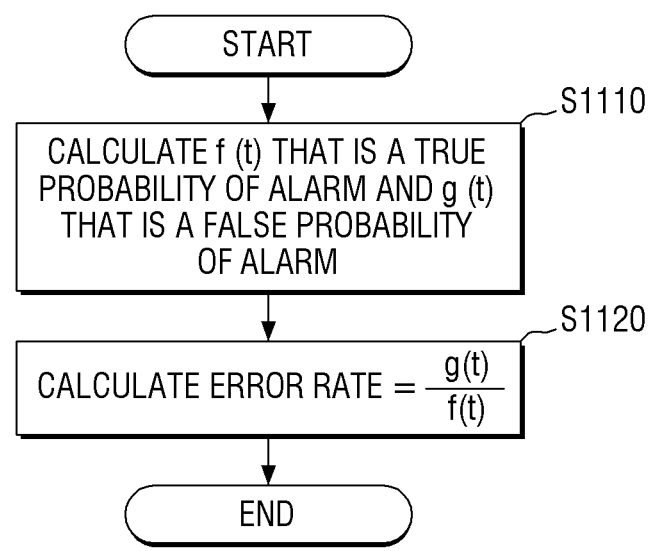
FIG. 11 is a flowchart for explaining a method for calculating the error rate of alarm according to an embodiment of the present invention.

FIG. 11 is a flow chart for explaining a method for calculating the error rate of alarm according to an embodiment of the present invention.

The bootstrap estimation unit 120 calculates the f function meaning the probability that the alarm is true and the g function meaning the probability that the alarm is false, from the past failure record data (S1110). Where, the f function may be calculated from the cumulative distribution function of the facility service life, and the g function may be calculated from the cumulative distribution function of the lead time.

Thereafter, the error rate of alarm is calculated at a rate of the f function to the g function (S1120). The calculated error rate may be stored in the storage unit 110 together with the failure record data, and may be used to determine the error rate of other alarms.

According to the method for calculating the error rate of alarm according to an embodiment of the present invention described above, it is possible to achieve an effect capable of estimating the error rate of the alarms generated in a successive time from the past data and providing the error rate to the user.

Figure 12:
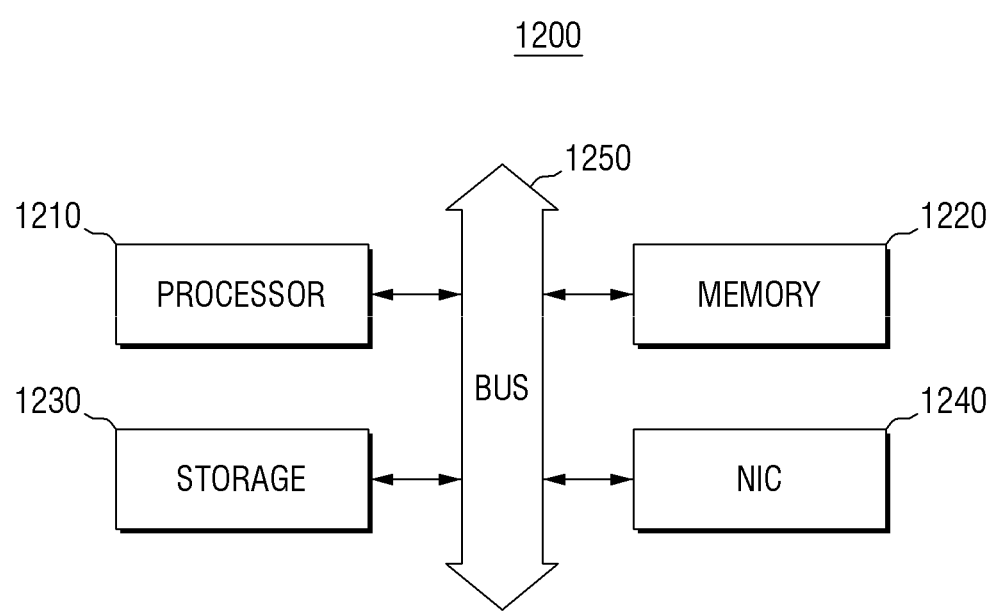
FIG. 12 is a diagram for explaining an apparatus for calculating the error rate of alarm according to another embodiment of the present invention.

FIG. 12 is a diagram for explaining an apparatus for calculating the error rate of alarm according to another embodiment of the present invention.

An apparatus 1200 for calculating the error rate of alarm illustrated in FIG. 12 includes a processor 1210, a memory 1220, a storage 1230, a network interface 1240 and a bus 1250.

In the relay apparatus 1000 illustrated in FIG. 12, only the components relevant to embodiments of the present invention are illustrated. Therefore, it is understood by a person having an ordinary skill in the art to which this invention pertains that other general-purpose components can be further included, in addition to the components illustrated in FIG. 12.

The processor 1210 may execute a program capable of calculating an error rate of alarm. However, the program capable of being executed by the processor 1210 is not limited thereto, and other general-purpose program may also be executed.

The memory 1220 may load a program capable of calculating an error rate of alarm so that the program can be executed by the processor 1210.

The storage 1230 stores a program capable of calculating the error rate of alarm, data relevant to the failure that occurs in the past in the facility, and an error rate of the alarm generated in the past.

Here, the program capable of calculating the error rate of alarm executes a step of calculating the true probability and the false probability of the alarms generated for each time zone by the past failure record data, and a step of calculating the error rate of the alarm at a rate of true probability to the false probability of the alarms generated for each time zone.

Other computing devices may be connected to the network interface 1240. For example, the facility to be managed, user devices to which the alarm is provided or the like may be connected via the network interface 1240.

The bus 1250 serves as a data moving path to which the processor 1210, the memory 1220, the storage 1230 and the network interface 1240 are connected.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method for calculating an error rate of an alarm that reports a failure of a facility, the method comprising:
    calculating a true probability of alarms generated within a period of time occurring during a day and a false probability of the alarms generated within the period of time occurring during the day based on a past failure record data of the facility; and
    calculating the error rate of the alarm as a ratio of the false probability of the alarms to the true probability of the alarms generated within the period of time occurring during the day.

2. The method of claim 1, wherein calculating the true probability and the false probability of the alarms comprises:
    calculating a cumulative distribution function (CDF) of a service life of the facility based on the past failure record data of the facility; and
    calculating the cumulative distribution function of a lead time based on the past failure record data of the facility.

3. The method of claim 2, wherein calculating the cumulative distribution function of the service life of the facility comprises:
    sampling a time interval in which a facility inspection is performed, based on service life of the facility, as a plurality of sampled service life data of the facility; and
    calculating the cumulative distribution function of the service life of the facility based on the plurality of sampled service life data of the facility.

4. The method of claim 3, wherein calculating the cumulative distribution function of the service life of the facility comprises:
    configuring a plurality of data groups including the plurality of the service life data, by randomly extracting any number of data among the plurality of sampled facility service life data;
    calculating a probability that a certain facility service life data is included for each data group; and
    calculating the cumulative distribution function of the certain facility service life data in the entire plurality of sampled service life data by calculating an average value of the probability.

5. The method of claim 2, wherein calculating the cumulative distribution function of the lead time comprises:
    sampling a difference between a time of occurrence of failure in the past and a time of generation of the alarm; and
    calculating the cumulative distribution function of the lead time by a difference between the sampled time of occurrence of failure time in the past and the time of generation of the alarm.

6. The method of claim 1, further comprising:
    storing a failure record data used to calculate the error rate of the alarm and storing the error rate of the alarm.

7. The method of claim 6, wherein storing the failure record data comprises:
    storing a time at which a facility inspection is performed on the facility, an alarm generation time, a failure occurrence time, and a lead time of the alarm generation time.

8. The method of claim 1, further comprising:
    when a new alarm is generated, estimating a new error rate calculated by new failure record data corresponding to the failure record data.

9. The method of claim 8, further comprising:
    providing the new alarm to a user if the new error rate of the new alarm is less than a preset threshold value.

10. An apparatus for calculating an error rate of an alarm that reports an occurrence of failure of a facility, the apparatus comprising:
    a memory configured to store a past failure record data of the facility;
    a bootstrap estimation unit configured to calculate a true probability of alarms generated within a period of time occurring during a day and a false probability of the alarms generated within the period of time occurring during a day based on the past failure record data of the facility; and
    an error rate calculation unit configured to calculate the error rate of the alarm as a ratio of the false probability of the alarms to the true probability of the alarms generated within the period of time occurring during the day.

11. The apparatus of claim 10, wherein the bootstrap estimation unit is further configured to calculate a cumulative distribution function (CDF) of a service life of the facility, and a cumulative distribution function of a lead time, based on the past failure record data of the facility.

12. The apparatus of claim 11, wherein the bootstrap estimation unit is further configured to sample a time interval of a facility inspection based on the service life of the facility, as a plurality of sampled service life data of the facility, and calculate the cumulative distribution function of the facility service life based on the plurality of sampled service life data of the facility.

13. The apparatus of claim 12, wherein the bootstrap estimation unit is further configured to configure a plurality of data groups including the plurality of the service life data, by randomly extracting any number of data among the plurality of sampled facility service life data, calculate a probability that a certain facility service life data is included for each data group, and calculate the cumulative distribution function of the certain facility service life data in the entire plurality of sampled service life data by calculating an average value of the probability.

14. The apparatus of claim 11, wherein the bootstrap estimation unit is further configured to sample a difference between a time of occurrence of failure in the past and a time of generation of the alarm, and calculate the cumulative distribution function of the lead time by a difference between the sampled time of failure occurrence of failure time in the past and the time of generation of the alarm.

15. The apparatus of claim 10, wherein the memory is further configured to store:
    a failure record data used to calculate the error rate of the alarm; and
    the error rate of the alarm.

16. The apparatus of claim 15, wherein the failure record data is at least one of a time of performance of facility inspection on the facility, an alarm generation time, a failure occurrence time, and a lead time of the alarm generation time.

17. The apparatus of claim 10, further comprising:
    a selection unit configured to estimate a new error rate calculated by new failure record data corresponding to the failure record data, in response to generation of the new alarm.

18. The apparatus of claim 17, further comprising:
an alarm generation unit configured to provide the new alarm to a user if the new error rate of the new alarm is less than a preset threshold value.

19. An apparatus for calculating an error rate of an alarm that reports a failure of a facility, the apparatus comprising:
at least one processor;
a memory configured to load a computer program executed by the processors; and
a storage configured to store a computer program that manages a license, wherein the computer program comprises a set of instructions which are executable by the at least one processor to:
calculate a true probability of alarms generated and a false probability of alarms generated within a period of time occurring during a day and a false probability of the alarms generated within the period of time occurring during a day based on a past failure record data; and
calculate the error rate of the alarm as a ratio of the false probability to the true probability of the alarms generated within the period of time occurring during the day.

20. A non-transitory computer-readable recording medium having embodied thereon a computer program, which when executed by a computer causes the computer to execute a method for calculating an error rate of an alarm that reports a failure of a facility, the method comprising:
calculating a true probability of alarms generated within a period of time occurring during a day and a false probability of the alarms generated within the period of time occurring during the day based on a past failure record data of the facility; and
calculating the error rate of the alarm as a ratio of the false probability of the alarms to the true probability of the alarms generated within the period of time occurring during the day.

* * * * *